United States Patent [19]

Nakai et al.

[11] Patent Number: 5,174,951
[45] Date of Patent: Dec. 29, 1992

[54] METHOD OF PRODUCING A POROUS METAL AND A METAL PRODUCT USING THE SAME SUCH AS A CATALYST CARRIER

[75] Inventors: Kiyoshi Nakai, Fujieda; Tokuhiko Ikki, Fukuroi, both of Japan

[73] Assignee: Asahi Tec Corporation, Shizuoka, Japan

[21] Appl. No.: 631,875

[22] Filed: Dec. 21, 1990

[30] Foreign Application Priority Data

Nov. 5, 1990 [JP] Japan .................................. 2-299634
Nov. 5, 1990 [JP] Japan .................................. 2-299635

[51] Int. Cl.⁵ .............................................. B22F 7/04
[52] U.S. Cl. .......................................... 419/2; 419/36; 419/37; 419/38
[58] Field of Search ................. 419/2, 24, 10, 30, 31, 419/3, 4, 6, 7, 36, 37, 38

[56] References Cited

U.S. PATENT DOCUMENTS

| | | | |
|---|---|---|---|
| 2,970,905 | 2/1961 | Doll | 419/6 |
| 3,409,473 | 11/1968 | Weber et al. | 419/6 |
| 3,454,396 | 7/1969 | Johnson et al. | 419/6 |
| 3,627,519 | 12/1971 | Baker | 419/2 |
| 3,795,511 | 3/1974 | Nimi et al. | 419/7 |
| 3,887,365 | 6/1975 | Sherfey | 419/2 |
| 4,017,570 | 4/1977 | Rice et al. | 419/2 |
| 4,562,039 | 12/1985 | Koehler | 419/2 |
| 4,569,821 | 2/1986 | Duperray et al. | 419/2 |
| 4,613,369 | 9/1986 | Koehler | 419/2 X |
| 4,722,824 | 2/1988 | Wiech, Jr. | 419/6 |
| 4,729,871 | 3/1988 | Morimoto | 419/2 X |
| 4,780,437 | 10/1988 | Smith | 419/2 X |

FOREIGN PATENT DOCUMENTS 62-154572 7/1987 Japan .
63-171802 7/1988 Japan .

OTHER PUBLICATIONS

WPIL, File Supplier, accession No. 88-238807 [34], Derwent Publications Ltd., London, GB; & JP-A-63 171 802 (Kobe Steel) Jul. 15, 1988 *Abstract*.
WPIL, File Supplier, accession No. 84-021506 [04], Derwent Publications Ltd., London, GB; & JP-A-58 213 684 (Toppan Printing K.K.) Dec. 12, 1983.
Patent Abstracts of Japan, vol. 11, No. 387 (E-566), Dec. 17, 1987; & JP-A-62 154 572 (Fuji Electric Corp.) Jul. 9, 1987 *Abstract*.

Primary Examiner—Donald P. Walsh
Assistant Examiner—Daniel Jenkins
Attorney, Agent, or Firm—Oblon, Spivak, McClelland, Maier & Neustadt

[57] ABSTRACT

A method of producing a porous metal, which comprises forming a mixture of a metal powder and a fibrous substance and subjecting the mixture to sintering treatment to obtain a porous metal; a catalyst carrier obtained by laminating a dried sheet wherein a metal powder is supported in a fibrous substance with a dried sheet obtained by corrugating a dried sheet similar to the first-mentioned sheet to form an assembly of a number of cells having both ends opened and subjecting the assembly to sintering treatment; and a filter element obtained by laminating a dried sheet wherein a metal powder is supported in a fibrous substance with a dried sheet obtained by corrugating a dried sheet similar to the first-mentioned sheet to form an assembly of a number of cells whose one end is opened and whose other end is closed and subjecting the assembly to sintering treatment.

2 Claims, 5 Drawing Sheets

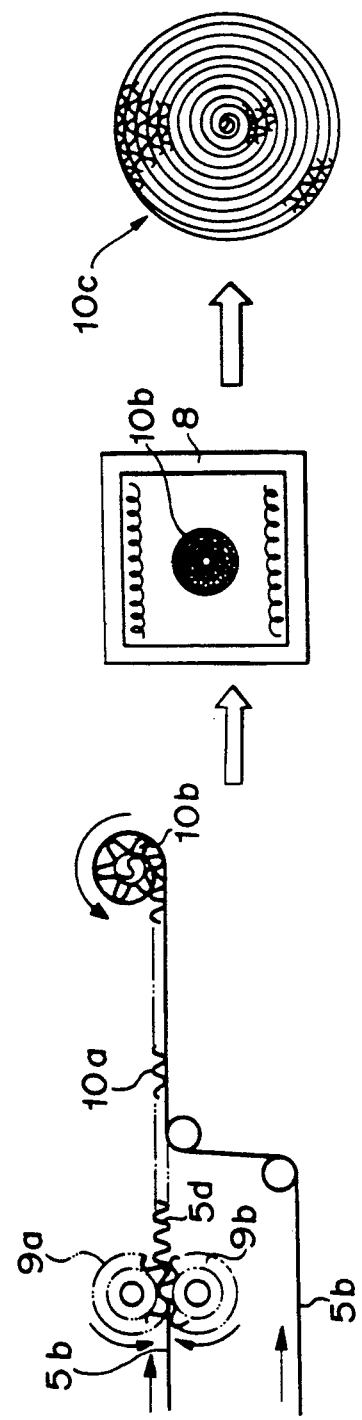

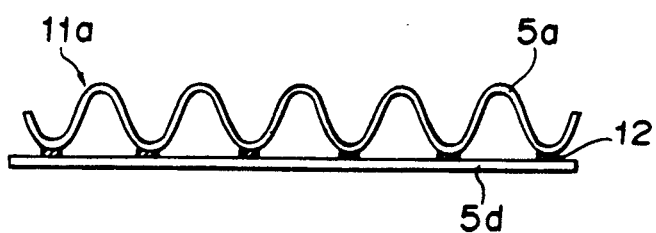
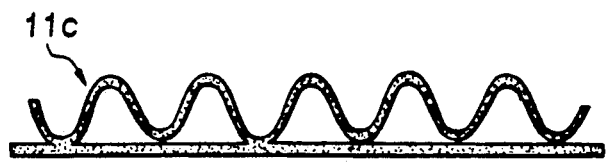

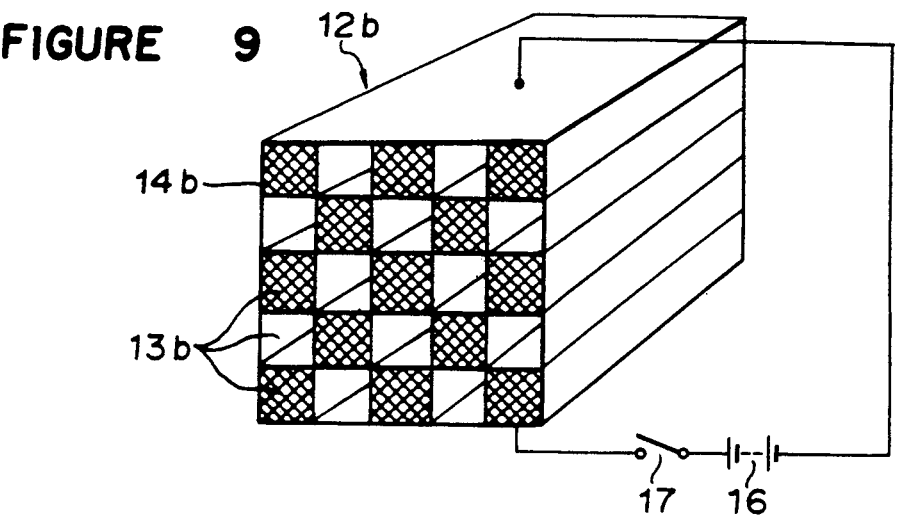
FIGURE 9
FIGURE 10
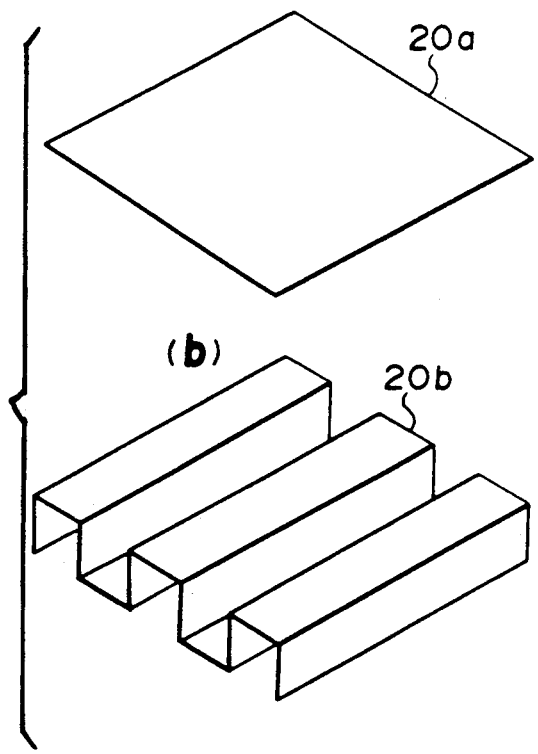

METHOD OF PRODUCING A POROUS METAL AND A METAL PRODUCT USING THE SAME SUCH AS A CATALYST CARRIER

BACKGROUND OF THE INVENTION

1. Field of the Invention

The present invention relates to a method of producing a porous metal and a metal product using the same such as a catalyst carrier and a filter element.

2. Discussion of the Related Art

Conventionally, in order to make $NO_x$ or the like contained in exhaust gas from engines nontoxic, use is made of catalyst converters using platinum as a catalyst. As the carrier for supporting the catalyst, ceramics and metal plates that are molded into a honeycomb structure are known.

Ceramic catalyst carriers are obtained by molding a raw material into a honeycomb structure and baking it. Also, catalyst carriers made of metal plates are constructed by placing a corrugated metal band and a flat metal band one over the other and rolling them as disclosed, for example, in Japanese Unexamined Patent Publication No. 71547/1987.

Also, the tendency of desire for cleaning the environment has recently increased, and it is even desired to eliminate black smoke released from engines, particularly from diesel engines that use light oil as fuel. The black smoke is composed of carbonized fine particles. Therefore, it is possible to eliminate them by a filter element having openings smaller than the particle diameter.

However, since the above catalyst converter does not have any filtering function, it cannot be used to treat black smoke simultaneously with the treatment of gases such as $NO_x$. If the catalyst converter is made to have a filtering function, clogging will take place immediately, and as a result not only the function of the catalyst converter itself lowers but also the exhaust system of the engine is choked thereby causing the ability of the engine itself to lower.

As filter elements having openings smaller than the above carbonized fine particles, those made of a porous sintered metal or ceramic are known. The known filter elements are used in food manufacturing processes and other manufacturing processes.

However, the above ceramic catalyst carrier is attended with drawbacks that it is weak in impact and is liable to be broken.

The above metal plate catalyst carrier has a drawback that the cost is high because adjacent parts of the two metal plates are needed to be welded and a large-sized press apparatus is needed for corrugating a metal band. Further, the Fe-Al metal used in the catalyst carrier involves a manufacturing problem that it is difficult to roll.

It is impossible to arrange the above known filter element in a limited space such as the exhaust system of an engine with the filtering area made large. This is because the known filter element only has a flat filtering surface or at most only has a single cylindrical shape.

Further, a filter element used in the exhaust system of an engine must be one that can be easily regenerated. If the filter element cannot be regenerated and is replaced at every time of its clogging, not only the cost becomes so high that it cannot be adopted but also a problem that replacing work is needed arises.

SUMMARY OF THE INVENTION

The present invention has been made to overcome the above problems and a first object of the present invention is to provide a method of producing a porous metal suitable for catalyst carriers and filter elements without requiring a large-scale manufacturing apparatus such as a rolling mill.

Another object of the present invention is to provide inexpensive and tough catalyst carrier and filter element made of a porous metal.

A still another object of the present invention is to provide a filter element that can be readily regenerated.

The method of producing a porous metal according to the present invention is characterized by forming a mixture of a metal powder and a fibrous substance and subjecting the mixture to sintering treatment to obtain a porous metal.

The fibrous substance is characterized in that it comprises pulp.

The mixture is characterized in that it comprises one obtained by mixing and stirring a metal powder and a fibrous substance in water and subjecting the mixture to dehydration and drying treatment.

The mixture is characterized in that it comprises a dried sheet obtained by mixing and stirring a metal powder and a fibrous substance in water, removing water from the mixture by a screen to form a sheet, and subjecting the sheet to drying treatment.

The dried sheet is characterized in that it is worked into the shape of a catalyst carrier, a filter element or the like and the worked item is subjected to sintering treatment.

The working of the worked item into the shape of a catalyst carrier, a filter element or the like is carried out by using an adhesive containing a metal powder.

The catalyst carrier of the present invention is obtained by laminating a dried sheet wherein a metal powder is supported in a fibrous substance with a dried sheet obtained by corrugating a dried sheet similar to the first-mentioned sheet to form an assembly of a number of cells having both opposite ends opened and subjecting the assembly of cells to sintering treatment.

The assembly of cells is characterized in that it is formed by laminating a dried sheet with a corrugated dried sheet and rolling the laminate.

The filter element of the present invention is obtained by laminating a dried sheet wherein a metal powder is supported in a fibrous substance and a dried sheet obtained by corrugating a dried sheet similar to the first-mentioned sheet to form an assembly of a number of cells whose one end is opened and whose other end is closed and subjecting the assembly to sintering treatment.

The assembly of cells is characterized in that it comprises one obtained by laminating a dried sheet and a corrugated dried sheet and rolling the laminate.

The filter element is characterized in that it is provided with electric current applying means.

As the metal powder, any powder of an iron or non-iron type metal such as iron, copper, aluminum, gold, and silver or an alloy may be used, and the type of the metal powder is not restricted if it can be subjected to sintering treatment. Further, a mixture of two or more metal powders may be used.

The type of metal powder to be used will be decided depending on the application of the final product. For example, if the final product is a decorative article made of a noble metal, a noble metal powder such as gold powder or silver powder is used, while if the final product is used as a filter element or a catalyst carrier for treating exhaust gas from engines, an Fe-Al type powder is used.

As the fibrous substance, any of natural fibers or synthetic fibers can be used if it can support the metal powder and can be burnt out when subjected to sintering treatment. Pulp is particularly preferably used since it is inexpensive and readily available.

For the sintering treatment, a known sintering oven used in powder metallurgy or the like can be employed. It is not required particularly to compress the material as known powder metallurgy.

The sintering temperature is decided depending on the type of the metal powder and the particle diameter of the metal powder. For example, the sintering temperature is from 1,100° to 1,250° C. for Fe powder.

The mixture of a metal powder and a fibrous substance is obtained in the presence of water. That is, the mixture is obtained by placing a metal powder, a fibrous substance, and water in a tank and mixing and stirring them by an agitator.

The mixing ratio of the thus obtained mixture (slurry) will be decided depending on the use of the final product, that is, depending on the thickness of the final product and the proportion of the openings of the porous metal.

When the slurry is produced, a polymer flocculant is added, by which the metal powder can be supported uniformly on the fibrous substance.

As the polymer flocculant to be added, a cationic or anionic flocculant is selected depending the type of the metal powder and the type of the fibrous substance and the amount of the polymer flocculant to be added is suitably selected depending, for example, on the the type of the fibrous substance and the metal powder. If the fibrous substance is a synthetic fibrous substance, some types of the fibrous substances do not require the addition of a polymer flocculant. Therefore the addition of a polymer flocculant is not an essential requirement.

The slurry is dehydrated by a screen. That is, the slurry is dehydrated according to the principle known in paper making and is formed into a sheet. With respect to the openings of the screen used, it is enough if they can catch most of the fibrous substance and those having a size of from 60 to 100 meshes can be used. The sheet can be formed into the shape of a band by constructing the screen into an endless belt as is known in a paper making machine.

The sheet formed on a screen is dehydrated by solar drying or forced drying. Since the sheet that has been dried (dried sheet) has a shape and properties similar to common papers, the sheet can be worked, for example, cut, folded, bent, or stuck like common papers.

The thickness of the dried sheet will be decided taking the thickness of the final product into consideration. That is, since the dried sheet shrinks to a certain degree, when subjected to sintering treatment, depending on the type of the fibrous substance, the type of the metal powder, the mixing ratio of them, and the sintering temperature, the thickness of the dried sheet is decided taking this degree of shrinkage into account. Similarly, the outer shape of the dried sheet is also decided taking the degree of shrinkage into account.

BRIEF DESCRIPTION OF THE DRAWINGS

FIG. 2 is a flow chart showing an example for producing a catalyst carrier.

FIGS. 3 to 5 are diagrams illustrating the effect of an adhesive.

FIG. 6 is a front view thereof; FIG. 7 (a) is a left side view thereof; FIG. 7 (b) is a right side view thereof; and FIG. 8 is a longitudinal sectional view thereof.

FIGS. 9 and 10 show a second filter element: FIG. 9 is a perspective view thereof; and FIG. 10 is an exploded perspective view thereof.

DESCRIPTION OF THE PREFERRED EMBODIMENTS

Example 1

Figure 1:
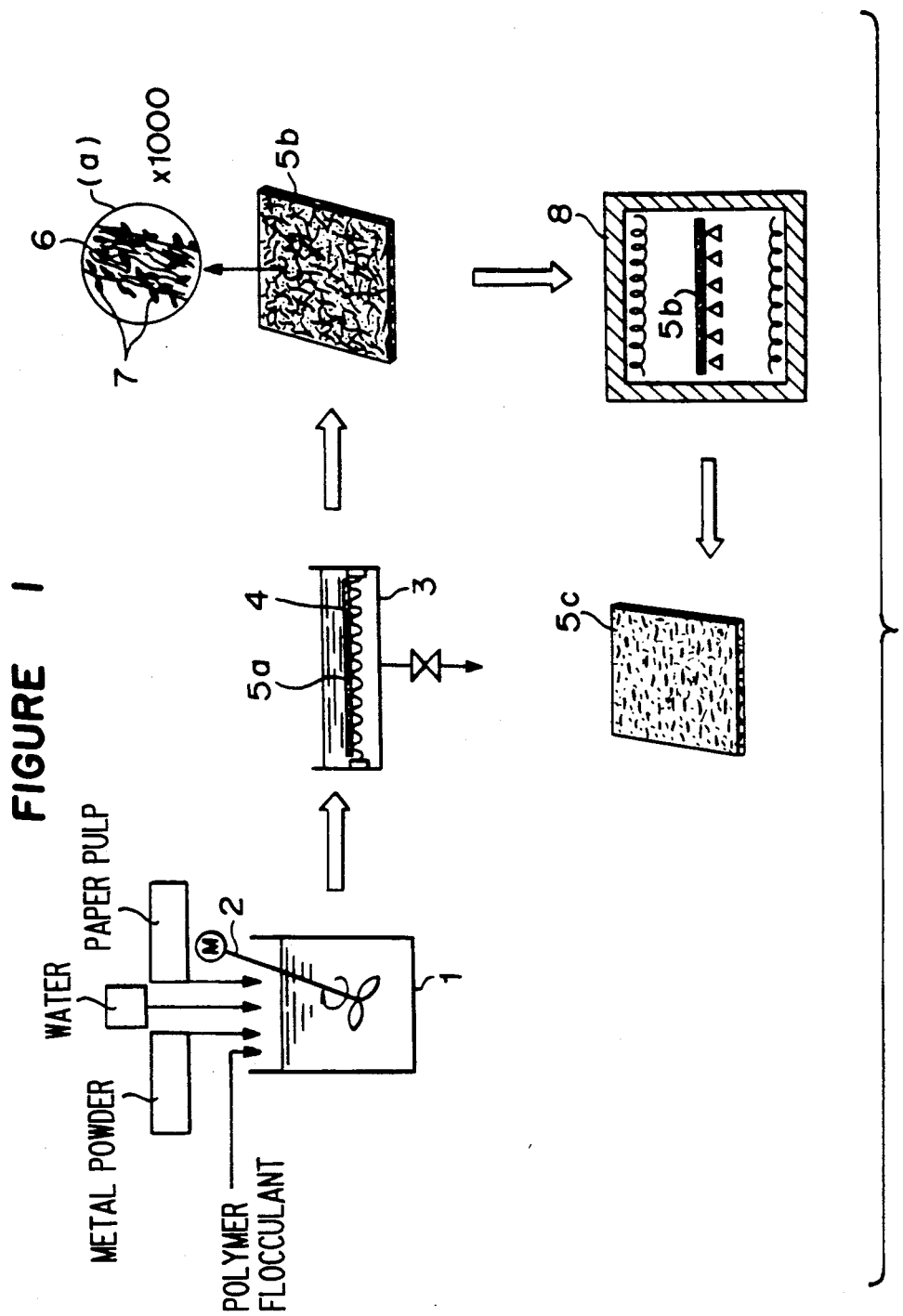
FIG. 1 is a flow sheet showing an example for carrying out the present method.

(1) A porous metal product according to the present invention was obtained by following the flow sheet shown in FIG. 1.

First, 1163 ml of water was placed in the tank 1, then 6.25 g of a metal powder of pure iron having an average particle diameter of 2.7 μm and 3.125 g of pulp (a 8:2 mixture of NBKP and LBKP) were added thereto, and after $0.94 \times 10^{-2}$ g of a polymer flocculant(Hiholder 936 manufactured by Kurita Kogyo KK) was added, they were mixed and stirred by an agitator 2 thereby obtaining a slurry.

The slurry was transferred into a container 3 and was screened through a 80-mesh screen 4 in the same way as in paper making to obtain a sheet 5a.

The sheet 5a was forcibly dried by warm air. The dried sheet 5b had a thickness of from 120 to 130 μm.

In FIG. 1, (a) shows the state of the dried sheet 5b which is magnified 1000 times, from which it can be understood that the metal powder 7 is supported uniformly in the pulp 6.

When the polymer flocculant was not added, the metal powder 7 supported by the pulp 6 was scattered unevenly and after the sintering treatment, a desired porous metal product in the form of a sheet could not be obtained.

The dried sheet 5b was sintered by heating it in a sintering oven 8 at 1,100° C. for 120 min. Thus, a porous metal product 5c in the form of a sheet having a thickness of 50 μm was obtained.

When the sintering temperature was 1,200° C., the porousness disappeared, and a flat platelike metal product was obtained.

(2) The dried sheet 5b obtained as above was cut into squares, the square sheet was folded to form a folded crane, and when the folded crane was subjected to sintering treatment in the sintering oven 8 for 120 min, a porous metal product was obtained with the original shape of the folded crane almost kept. The porous metal product, i.e., a folded crane had a value enough as a decorative article.

Example 2

A catalyst carrier was produced by using the elongate dried sheets 5b having a width of 15 cm obtained in Example 1 above. The process of producing it is shown in FIG. 2. That is, one of the sheets 5b was molded by gear type presses 9a, 9b into a corrugate sheet 5d having a sine-wave shape with a height of 3 mm, the corrugated sheet 5d and the other flat sheet 5b were bonded together with an adhesive to form a laminate 10a, and the laminate 10a was rolled to form an assembly 10b having a diameter of 14 cm. The adhesive that was used was one obtained by adding the same metal powder as above to a commercially available glue in a volume ratio of 0.1 to 1.

The rolled assembly 10b was sintered in the sintering oven 8 at 1,100° C. for 120 min. Thus, a porous metal catalyst carrier 10c having a cylindrical shape with a length of 11 cm and a diameter of 10 cm and having a thickness of 50 μm was obtained. In FIG. 2, one end of the cylinder of the catalyst carrier 10c is shown.

It is important that an adhesive containing a metal powder is used when the dried sheet member 5b is shaped into an intended porous metal product.

FIGS. 3 to 5 are views illustrating the difference in bonding effect in the case where a metal powder was contained in an adhesive and in the case where a metal powder was not contained in the adhesive.

The worked item 11a shown in FIG. 3 was obtained by putting together the above flat dried sheet member 5b and a dried sheet member 5d obtained by corrugating a similar flat dried sheet 5b, with an adhesive 12. The adhesive 12 was prepared by mixing uniformly a metal powder similar to that contained in the dried sheet member 5a (5b) with a starch glue in a volume ratio of 0.1 to 1.

FIG. 4 shows a porous sintered metal 11b obtained by subjecting the above worked item 11a to sintering treatment in a sintering oven at 1,200° C. for 120 min. At the joined sections of the obtained porous sintered metal, the dried sheet member 5b which was uniformly joined throughout and the corrugated dried sheet member 5d were integrated.

In contrast, in the case wherein a worked item 11c was prepared by using an adhesive containing no metal powder in a starch glue and was subjected to sintering treatment under the same conditions as above, the joined sections after the sintering treatment did not give a satisfactory joined state as shown in FIG. 5.

The proportion of the metal powder to be contained in the adhesive is not limited to the above ratio and may be in the range of from 0.003 to 0.5 (in the volume ratio) to 1 of the glue. The degree of the mixing proportion will be decided depending on the aimed porous metal product or the like.

Example 3

A filter element according to the present invention will now be described with reference to FIGS. 6 to 10.

Figure 6:
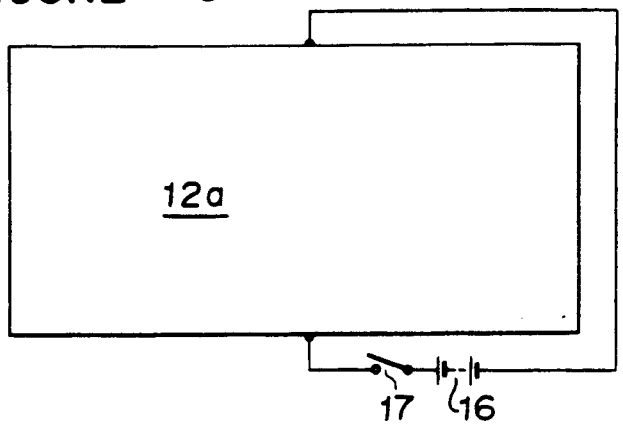
FIGS. 6 to 8 show a first filter element.
Figure 7:
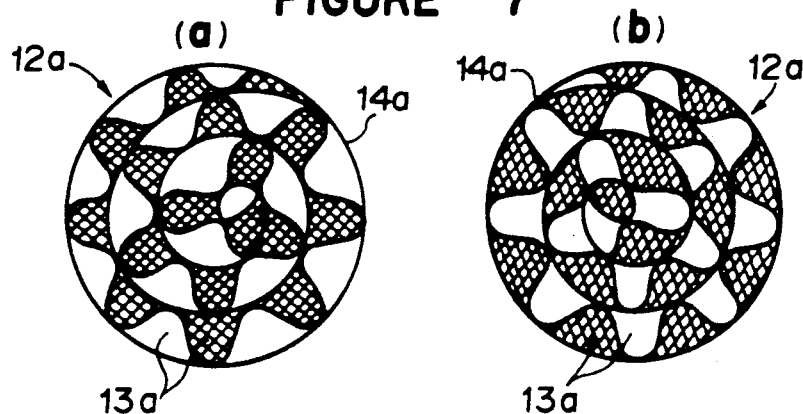
Figure 8:
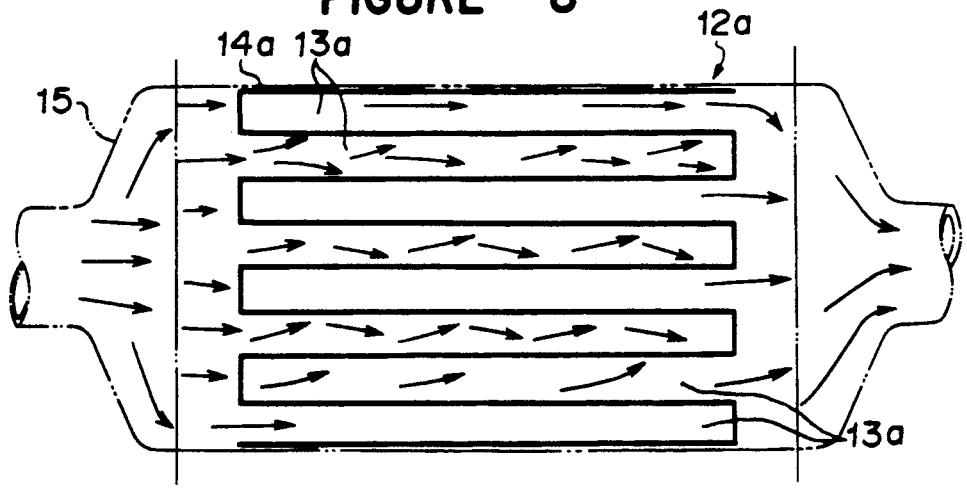

FIGS. 6 to 9 show a filter element 12a according to the first Example of a filter element: FIG. 6 is its front view; FIG. 7(a) is its left side elevational view; FIG. 7(b) is its right side elevational view; and FIG. 8 is its longitudinal sectional view.

The filter element 12a has a cylindrical shape in appearance and comprises an assembly 14a having a number of porous metal cells 13a, 13a . . . one end of which is opened and the other end of which is closed. The assembly 14a is formed by putting together a dried sheet member 5b as shown in FIG. 2 above, wherein a metal powder is supported, and a dried corrugated sheet member 5d formed by corrugating a dried sheet similar to the first dried sheet 5b and rolling them into a cylinder, and every other alternative honeycomb openings in the opposite end surfaces of the cylinder are cut by scissors and are closed by sticking with a glue containing a metal powder. In FIGS. 7(a) and 7(b), the shaded parts show the closed end wall surfaces. The closing is effected in such a manner that the both opposite ends of each cell 13 are not closed simultaneously. Then the thus formed cylindrical worked item is subjected to sintering treatment to obtain a filter element 12a.

The size of the openings and the ratio of the openings of the filter element are decided arbitrarily depending on conditions such as the sintering treatment temperature, the heating time, and the particle diameter of the metal powder. For example, even a pore diameter of 30 μm which is required for eliminating carbonized fine particles from the above exhaust gas can be easily obtained.

When the filter element 12a is used for treatment of exhaust gas from an engine, the filter element 12a is loaded in an exhaust gas path 15 of an engine as shown in FIG. 8. Therefore, the exhaust gas passing through the exhaust gas path 15 enters the inside from end surface where cells 13a are open as shown by arrows, flows into adjacent cells 13a through the side walls of the particular cells 13a, and leaves from the openings of the latter cells 13a. Of course, the exhaust gas will pass through the closed ends of the cells 13a 13a . . . since the closed ends are porous.

When the exhaust gas passes through the wall surfaces of the cells 13a, carbonized fine particles in the exhaust gas are caught on the wall surfaces, and the purified exhaust gas is released into the atmosphere. Since it is possible to allow the filter element 12a to carry a catalyst such as platinum, it can be possible to allow the filter element 12a to serve also as a catalyst converter.

When the treatment of exhaust gas is continued, the wall surfaces of the cells 13a will be clogged with carbonized fine particles. This clogging can be removed by heating the filter element 12a to burn out the carbonized fine particles. That is, since the filter element 12a is metallic and conductive, when an electric current is passed from a power source 16 to the filter element 12a by turning the switch 17 on, the filter element 12a generates heat in proportion to the electric resistance. In other words, the filter element 12a acts as an electric heater to burn out the carbonized fine particles.

The electric resistance of the filter element 12a is decided arbitrarily by choosing the type of the metal powder contained in the dried sheet member. In the case of a metal powder high in electric resistance such as nickel or chromium powder, heat can be generated efficiently.

Since the filter element 12a according to this Example is an assembly of porous metal cells whose adjacent ends are alternatively opened and closed, the filtering area can be made large, and when the filter element 12a is placed in an exhaust system of an engine, carbonized fine particles can be effectively eliminated.

The carbonized fine particles caught by the filter element 12a are burnt by causing the filter element 12a to act as an electric heater, so that the filter element can be regenerated.

FIGS. 9 and 10 show the filter element 12b according to the second Example of a filter element; FIG. 9 shows its perspective view; and FIG. 10 is its exploded perspective view.

The filter element 12b comprises an assembled body 14b of porous metal cells 13b, 13b . . . in the shape of a polygonal tube and is generally in the shape of a prism. The shaded sections in FIG. 9 are closed end walls of the cells 13b, and in the same manner as in the first filter element 12a, the ends of the adjacent cells are alternatively closed and opened.

The filter element 12b of this Example is produced by associating four types of dried sheets containing a metal powder as shown in FIGS. 10(a) to (d) to form an assembly 14b and subjecting it to sintering treatment.

That is, flat dried sheet members 20a having the same shape as that of the upper surface of the assembly 14b as shown in FIG. 10(a) and corrugated sheets 20b that are obtained by corrugating flat dried sheet members similar to the sheet members 20a and that have length and breadth dimensions in conformity with the dried sheet members 20a are alternatively laid and bonded with an adhesive containing a metal powder. Dried sheet members 20a are bonded also to the top and bottom corrugated sheets 20b.

Side plates 20c and 20d made of dried sheet members similar to the above dried sheets and having openings with a prescribed interval between them as shown in FIGS. 10(c) and (d) are bonded to the left and right ends of the above laminate with the adhesive containing a powder metal. The positional relationship of the openings of the side plates 20c and 20d is such that the openings of the cells 13b on the one side of the assembly 14b are alternatively opened and closed and the openings of the particular cells 13b on the other side of the assembly 14b are alternatively closed and opened so that one end of the cells 13b may be opened and the opposite end of the cells 13b may be closed.

The thus obtained assembly 14b is subjected to sintering treatment, and the sintered metal product is a porous metal product having the original shape retained and has a function as a filter element. Therefore this filter element 12b can filter carbonized fine particles in exhaust gas in the same way as the above first filter element 12a, and the carbonized fine particles can be burnt and removed by allowing the filter element 12b to act as an electric heater.

In this connection, the openings of the cells may not always be completely alternatively closed and opened but may be arranged in a scattered manner if the same filtering effect is obtained.

In the above case, although the filter element is used for treating gasses, it may be used for treating liquids of course.

Further, if the assembly 14b is formed without the side plates 20c and 20d and the assembly 14b is subjected to sintering treatment, the both opposite ends of the cells 13b are opened and it can be used as a catalyst carrier.

According to the method of producing a porous metal according to the present invention, since a metal powder is supported in a fibrous substance and is subjected to sintering treatment to mold the metal, a porous metal item can be quite easily obtained.

When the fibrous substance is pulp, a porous metal item can be obtained quite inexpensively.

Further, when a fibrous substance supporting a metal is made into a sheet in the way as used in paper making and the sheet is subjected to sintering treatment, a porous metal molded item that is in the shape of a quite thin sheet or band can be obtained.

Before sintering treatment, by working the shape of a dried sheet into the shape of the final product, for example, a complicated shape such as a folded crane, a catalyst carrier or a filter element, a porous metal product having that shape can be obtained. When dried sheets are twisted together, a threadlike porous metal product can be obtained.

Since the adhesive used in the production of an item contains the same metal powder as that contained in the sheet member, even if the sheet members are not joined firmly, the sections bonded with the adhesive can be joined uniformly after sintering treatment.

Since the catalyst carrier according to the present invention is obtained by subjecting a mixture of a metal powder and a fibrous substance to sintering treatment, the catalyst carrier can be molded into a porous metal catalyst carrier having a quite large surface area. Further, the catalyst carrier can be made as a tough catalyst carrier having a honeycomb structure.

Since the filter element according to the present invention comprises an assembly having porous metal cells whose ends are alternatively opened and closed or are opened and closed in a scattered manner, the filtering area can be made large, and when the filter element is placed in an exhaust system of an engine, carbonized fine particles in exhaust gas can be eliminated efficiently.

We claim:

1. A method of producing a porous metal, comprising the steps of:
   forming a mixture of a metal powder and a fibrous substance in water;
   removing water from the mixture by a screen to form a sheet;
   subjecting the sheet to a drying treatment;
   bonding said dried sheet from said drying step to a further dried sheet from said drying step to form a laminate sheet by using an adhesive comprising a metal powder that is the same as the metal powder used to form the mixture;
   working said laminate sheet into the shape of a final product of a craftwork, a catalyst carrier or a filter element; and
   subjecting said worked laminate sheet to a sintering treatment.

2. The method of producing a porous metal according to claim 1, wherein said fibrous substance comprises pulp.

* * * * *